United States Patent
Zhang et al.

(10) Patent No.: US 10,839,527 B2
(45) Date of Patent: Nov. 17, 2020

(54) METHOD AND DEVICE OF MEASURING INFRARED SPECTRAL CHARACTERISTICS OF MOVING TARGET

(71) Applicant: Huazhong University of Science and Technology, Wuhan (CN)

(72) Inventors: Tianxu Zhang, Wuhan (CN); Hongtao Yu, Wuhan (CN); Shoukui Yao, Wuhan (CN); Xiaobing Dai, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 16/458,219

(22) Filed: Jul. 1, 2019

(65) Prior Publication Data
US 2019/0325586 A1 Oct. 24, 2019

Related U.S. Application Data

(63) Continuation-in-part of application No. PCT/CN2017/077104, filed on Mar. 17, 2017.

(30) Foreign Application Priority Data

Dec. 31, 2016 (CN) .......................... 2016 1 1268920

(51) Int. Cl.
*G06T 7/246* (2017.01)
*G06T 7/194* (2017.01)
(Continued)

(52) U.S. Cl.
CPC ............ *G06T 7/246* (2017.01); *G01J 5/0809* (2013.01); *G06T 7/194* (2017.01); *G06T 7/73* (2017.01);
(Continued)

(58) Field of Classification Search
CPC .......... G06T 7/246; G06T 7/194; G06T 7/73; H04N 5/2254
See application file for complete search history.

(56) References Cited

U.S. PATENT DOCUMENTS

| 7,710,545 B2* | 5/2010 | Cramblitt | G01S 17/89 356/4.01 |
| 9,006,659 B2* | 4/2015 | Zhang | G01J 3/36 250/339.14 |

(Continued)

OTHER PUBLICATIONS

Xiangzhi Bai et al., "Fusion of Infrared and Visual Images Through Region Extraction by Using Multi-Scale Center Surround Top-Hat Transform";Optics Express 8444, Jan. 2011 (Year: 2011).*

*Primary Examiner* — Dramos Kalapodas
(74) *Attorney, Agent, or Firm* — JCIPRNET

(57) ABSTRACT

A method of measuring infrared spectral characteristics of a moving target, the method including: establishing a multi-dimensional and multi-scale model with infrared spectral features of an object-space target, and extracting an object-space region of interest measurement model; performing target detection on an actually measured infrared image, and identifying position information for each ROI of a target; tracking the target, to obtain the target's pixel differences between two frames, as well as a moving direction of the target, and performing motion compensation for the target; and scanning the target, and after successfully capturing an image of the target being tracked, controlling an inner framework to point to each target of interest, and according to moving-direction information of the target, performing N-pixel-size motion in a direction shifted by 90° with respect to the moving direction, and activating a spectrum measuring module.

5 Claims, 11 Drawing Sheets

(51) Int. Cl.
*G06T 7/73* (2017.01)
*G01J 5/08* (2006.01)
*H04N 5/225* (2006.01)
*G01J 5/00* (2006.01)

(52) U.S. Cl.
CPC .... *H04N 5/2254* (2013.01); *G01J 2005/0077* (2013.01); *G06T 2207/10048* (2013.01); *G06T 2207/20016* (2013.01); *G06T 2207/20081* (2013.01); *G06T 2207/20084* (2013.01)

(56) References Cited

U.S. PATENT DOCUMENTS

| | | | |
|---|---|---|---|
| 9,258,550 B1 * | 2/2016 | Sieracki | H04N 13/282 |
| 2009/0147238 A1 * | 6/2009 | Markov | G01J 3/06 |
| | | | 356/3 |
| 2011/0285995 A1 * | 11/2011 | Tkaczyk | G01J 3/021 |
| | | | 356/326 |
| 2019/0195689 A1 * | 6/2019 | McQuilkin | G01N 21/31 |

\* cited by examiner

METHOD AND DEVICE OF MEASURING INFRARED SPECTRAL CHARACTERISTICS OF MOVING TARGET

CROSS-REFERENCE TO RELATED APPLICATIONS

This application is a continuation-in-part of International Patent Application No. PCT/CN2017/077104 with an international filing date of Mar. 17, 2017, designating the United States, now pending, and further claims foreign priority benefits to Chinese Patent Application No. 201611268920.7 filed Dec. 31, 2016. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to a method and device of measuring infrared spectral characteristics of a moving target.

An imaging infrared spectrometer can capture image characteristics and infrared spectral characteristics of a target. However, much ineffective infrared spectral data is involved and cannot be processed in real-time; and the infrared spectrum of the target is acquired against the background infrared spectrum.

SUMMARY

Disclosed is a method of measuring infrared spectral characteristics that is multi-dimensional, multi-scale, accurate, and real-time.

The disclosure provides a method of measuring infrared spectral characteristics of a moving target, the method comprising:

(1) establishing a multi-dimensional and multi-scale model with infrared spectral features of an object-space target, and extracting an object-space region of interest measurement model;

(2) performing target detection on an actually measured infrared image, and identifying position information for each ROI of a target; tracking the target, to obtain the target's pixel differences between two frames, as well as a moving direction of the target, and then, according to the target's pixel differences between two frames, performing motion compensation for the target; and (3) scanning the target identified in (2), and after successfully capturing an image of the target being tracked, controlling an inner framework to point to each target of interest, and according to moving-direction information of the target, performing N-pixel-size motion in a direction shifted by 90° with respect to the moving direction, and activating a spectrum measuring module, and recording distance information between the measuring device and the target, and measuring azimuth information, scale information and time-dimension information, and inputting the above information into the object-space infrared-spectral-characteristic multi-dimensional multi-scale model obtained in (1) for the target.

(1) can comprise:

(1.1) establishing a three-dimensional model for a target to be measured;

(1.2) from the three-dimensional model, determining a ROI section of the target to be measured, and performing material classification to the three-dimensional model of the above-mentioned section to determine a radiation source; and (1.3) measuring infrared spectral characteristics of the radiation source, to obtain object-space infrared-spectral-characteristic distribution at a specific angle.

An object-space infrared spectrum radiation measurement characteristic of a target can be expressed as follows:

$$F_{rad}(x,y,z,\omega,S,T) \qquad (1)$$

where, $F_{rad}$( ) indicates radiation intensity of a target in the case where the target is in the Earth coordinate system, with a position (x, y, z), a measurement angle $\omega$, a scale S, and a time dimension T;

An image-space radiation measurement characteristic function for a target is described below:

for a point-like or speckle-like target, a radiation measurement characteristic $f_{rad1}$ is expressed as below:

$$f_{rad1}=f_{rad}(\bar{\theta},\lambda,r) \qquad (2)$$

where, $\bar{\theta}$ is an azimuth of a measuring instrument, $\lambda$ is an infrared spectral variable, r is a distance between the measuring instrument and the target;

for a plane-like target, a radiation measurement characteristic $f_{rad2}$ is expressed as below:

$$f_{rad2}=f_{rad}(\bar{\theta},\bar{x},\lambda,r) \qquad (3)$$

where, $\bar{x}$ is spatial distribution of the target, $\bar{\theta}$ is an azimuth of a measuring instrument, $\lambda$ is an infrared spectral variable, and r is a distance between the measuring instrument and the target.

(2) can comprise:

(2.1) performing multi-threaded operations to an input actually measured infrared image, including:

a $1^{st}$ thread: performing hyperpixel segmentation to obtain sky background, ground background, target regions, etc., and based on the segmentation result and measurement of area and grayscale features of a target, identifying background regions and taking as a negative sample;

a $2^{nd}$ thread: extracting full-image HOG features, and distinguish background from the target regions according to a slide-window method, thus obtaining a suspected target and taking as a positive sample;

a $3^{rd}$ thread: using a full convolutional neural network to detect an input image to obtain a target, and taking it as a positive sample;

(2.2) inputting the results obtained by the above threads into a pre-trained support-vector-machine (SVM) classifier, to obtain position information (x, y) of the image of the target;

(2.3) creating a Gaussian pyramid by using the image of the target, to obtain multi-scale information of the image and thereafter input it into the trained convolutional neural network (CNN) to obtain pixel differences ($\nabla x$, $\nabla y$) of respective ROIs of the target with respect to the center position of the target; and (2.4) detecting and obtaining position information of two-frame images of the target according to (2.2) and processing, to obtain the target's frame differences as well as the moving target's direction information from the two-frame images; based on the target's pixel differences between the two frames obtained in (2.3), performing motion compensation for the target.

The disclosure also provides a measurement device for implementing the measurement method, the device comprising: an industrial computer, a rotary mirror, a beam splitter, a medium-wave lens, a long-wave lens, a non-imaging infrared spectrum measuring unit, a long-wave infrared imaging unit; a control interface of the industrial computer is connected to the rotary mirror; the medium-wave lens is mounted on the non-imaging infrared spectrum measuring unit; an output end of the non-imaging infrared spectrum measuring unit is connected to an input end of the industrial computer; the long-wave lens is mounted on the long-wave infrared imaging unit; an output end of the long-wave infrared imaging unit is connected to the input end of the industrial computer.

The rotary mirror is adapted to reflect light of a target of interest to the beam splitter; the beam splitter is adapted to divide the received reflected light into a medium-wave light beam and a long-wave light beam, and transmit the light beams to the medium-wave lens and the long-wave lens, respectively, thus the light beams pass through the medium-wave lens and the long-wave lens, respectively, and then are transmitted to the non-imaging infrared spectrum measuring unit and the long-wave infrared imaging unit for processing; the non-imaging infrared spectrum measuring unit is adapted to process the received medium wave into infrared spectrum data and transmit it to the industrial computer; the long-wave infrared imaging unit is adapted to process the received long wave into image data and transmit it to the industrial computer; the industrial computer is adapted to control steering of the rotary mirror, and process the received infrared spectral data and image data to obtain multi-dimensional multi-scale infrared spectral characteristics of the moving target.

The rotary mirror adopts a four-framework servo control and comprises: a reflective mirror, an inner pitch framework, an inner azimuth framework, an outer pitch framework, and an outer azimuth framework, which are sequentially arranged from inside to outside.

The disclosure establishes a three-dimensional model in advance, then combines and compares the three-dimensional model with an actually measured and processed infrared spectrum to establish an infrared-spectrum multi-dimensional multi-scale characteristic expression formula for a target, so as to provide an accurate infrared-spectrum model for the target, and provide an accurate positioning method for a target of interest, and identify positions of respective components of the target of interest, thereby solving the problem in the prior art that an existing infrared-spectrum characteristic expression for a target is incomplete and inaccurate, and infrared spectrum cannot be measured or cannot be accurately measured.

DETAILED DESCRIPTION OF THE PREFERRED EMBODIMENTS

To further illustrate, embodiments detailing a method and device of measuring infrared spectral characteristics of a moving target are described below. It should be noted that the following embodiments are intended to describe and not to limit the disclosure.

Figure 1:
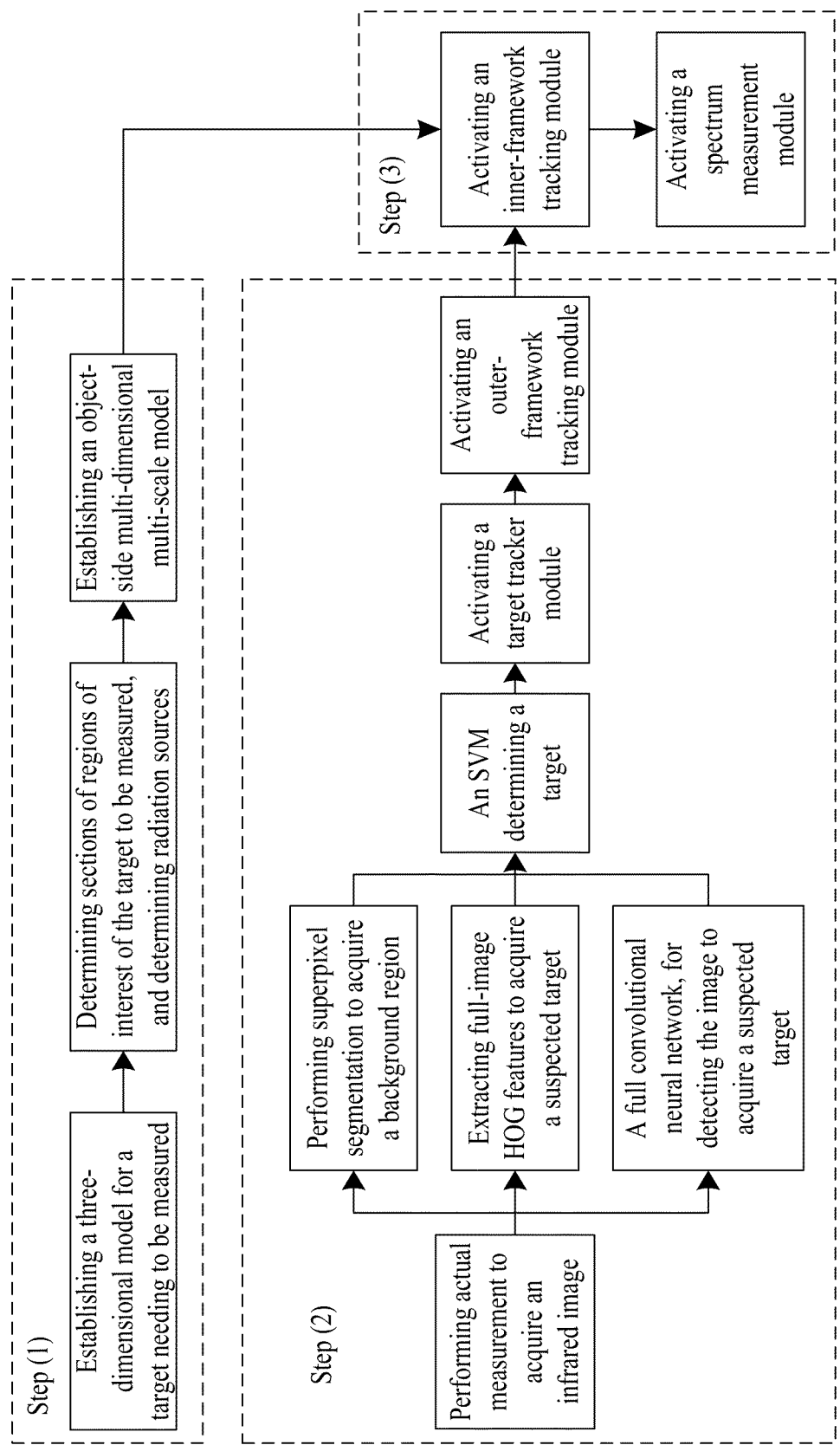
FIG. 1 is a flowchart of a method of measuring infrared spectral characteristics of a moving target as described in the disclosure.

Referring to FIG. 1, it is a general flowchart of a method of measuring infrared spectral characteristics of a moving target the disclosure. The method comprises the following steps:

(1) establishing a multi-dimensional and multi-scale model with infrared spectral features of an object-space target, and extracting an object-space region of interest measurement model.

(1.1) Establishing a three-dimensional model for a target to be measured.

Figure 4:
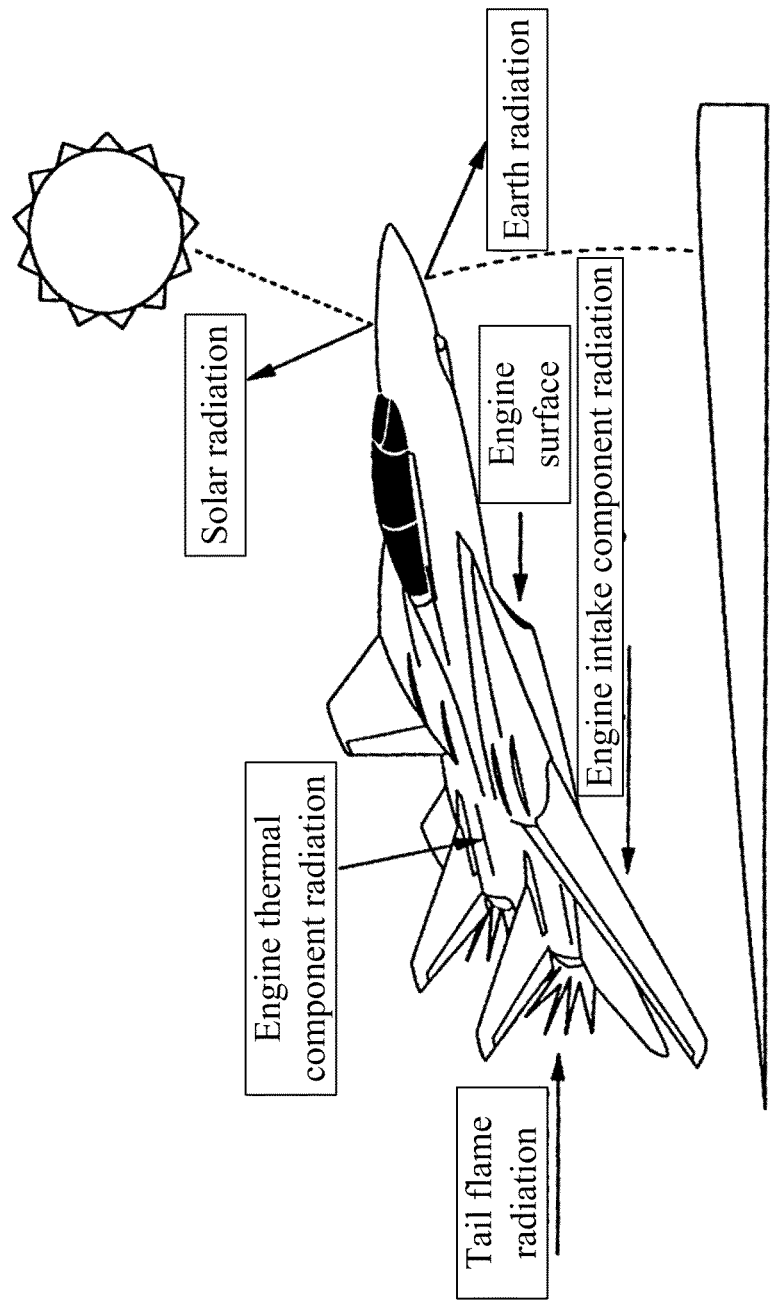
FIG. 4 is a marking map of regions of interest of an aircraft.
Figure 5:
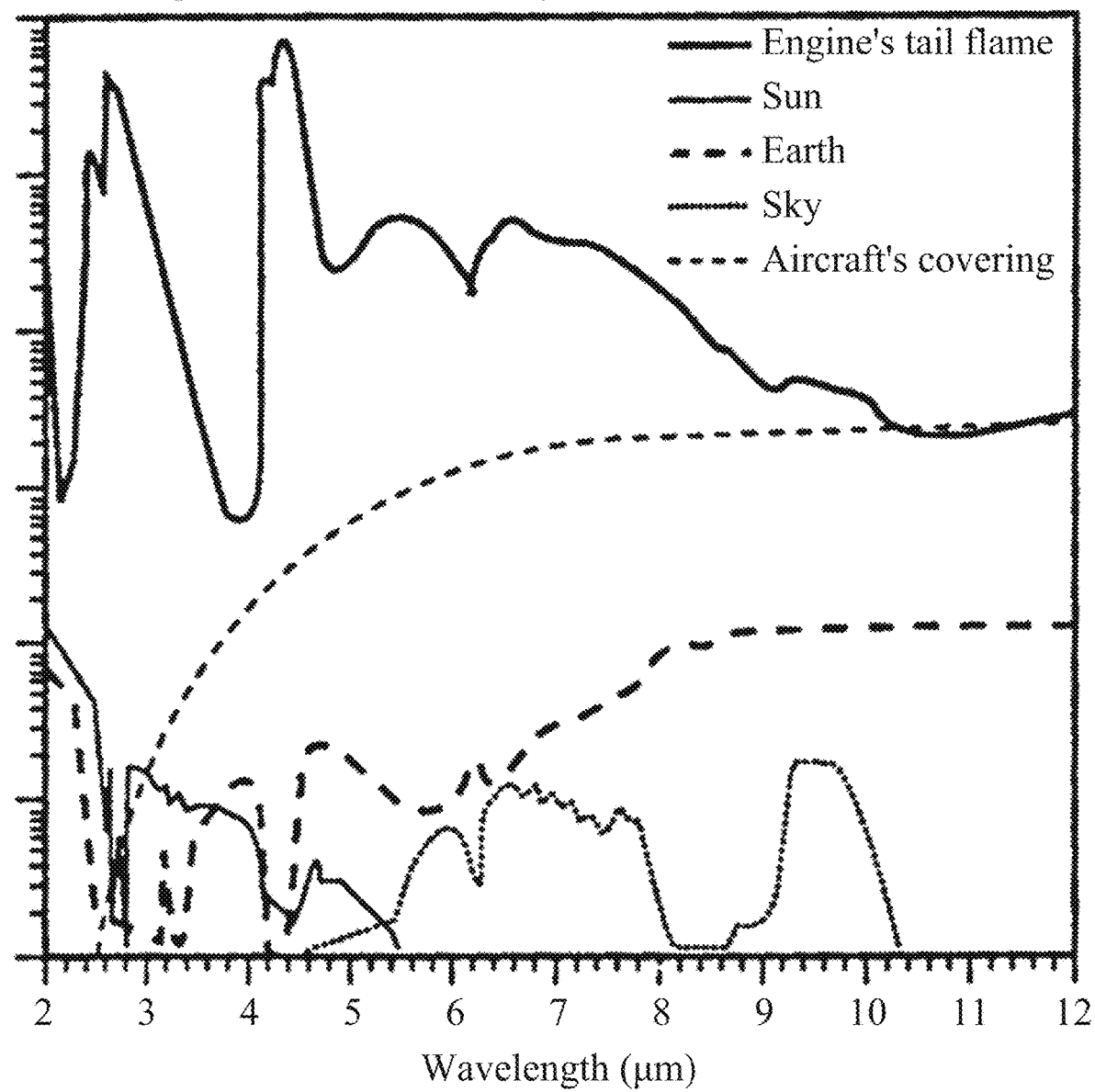
FIG. 5 is a diagram showing composition of infrared spectrum of an aircraft.

(1.2) Determining a ROI section of the target to be measured, and performing material classification to the three-dimensional model. For a stereo target, each point (x, y, z) of the target has infrared spectral characteristics, each point has a temperature, and emissivity may be different. For a time-sensitive target, movement of the target causes infrared spectral characteristics of the target to change. Taking an aircraft as an example, a model is established as shown in FIG. 4. Radiation sources of the infrared spectral characteristics of the aircraft mainly include: reflected solar radiation, reflected earth radiation, engine intake component radiation, pneumatically heated covering radiation, engine thermal component radiation, and tail flame radiation. The infrared spectrum measured for respective ROIs is shown in FIG. 5.

Figure 6:
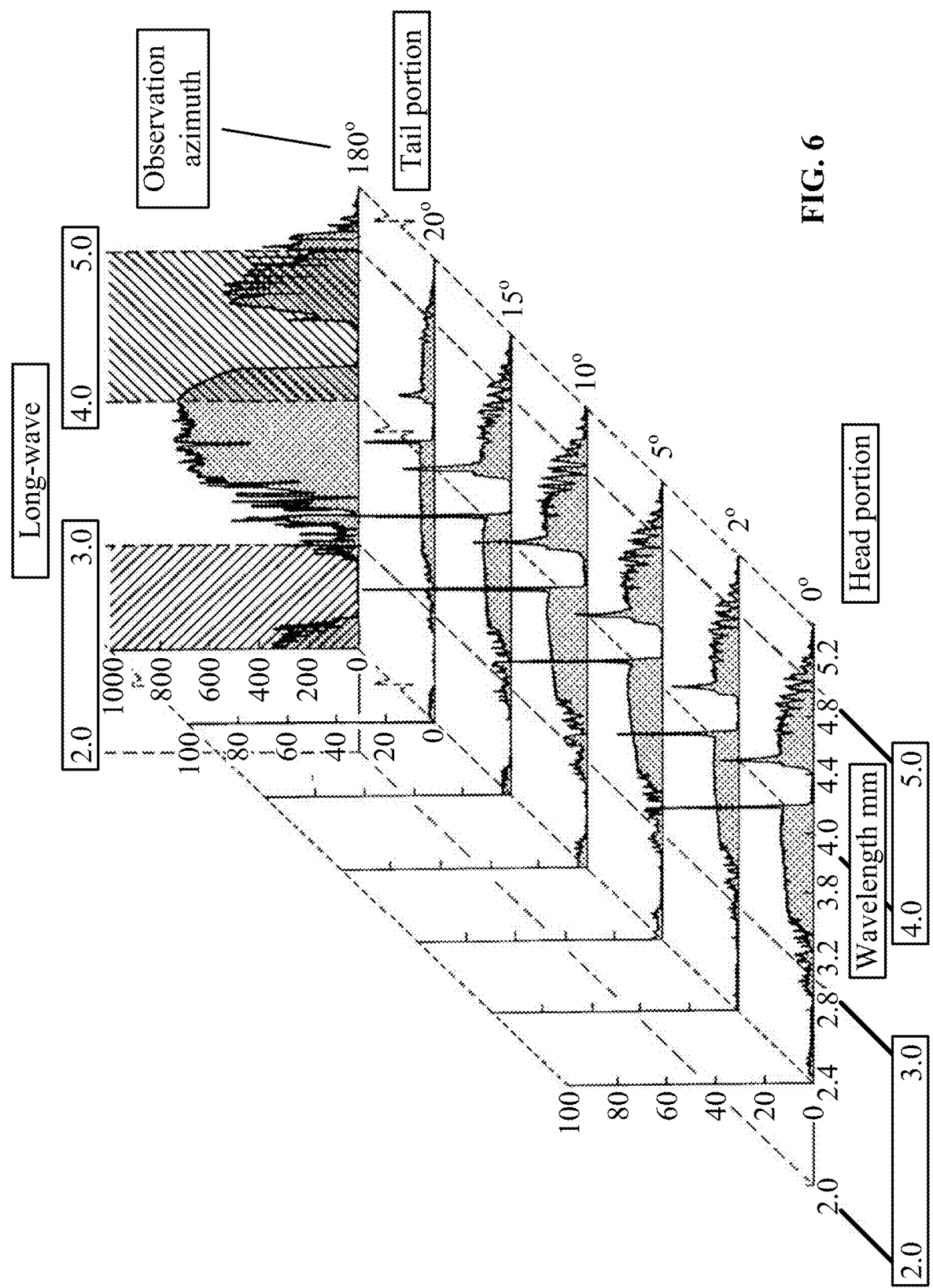
FIG. 6 shows graphs of infrared spectrum data of an aircraft measured with different azimuths.

(1.3) Acquiring data based on measurement of infrared spectral characteristic distribution of the radiation sources of the aircraft, thus obtaining infrared spectral characteristic distribution of the aircraft at a specific angle, and by means of measuring infrared spectrum of the target from different angles, obtaining infrared spectral characteristics of the target at different angles, as shown in FIG. 6, from which it can be known that, infrared spectral characteristics of the aircraft vary greatly in different observation azimuths.

An object-space radiation characteristic of the aircraft target may be expressed as below:

$$F_{rad}(x,y,z,\omega,S,T) \tag{1}$$

the above formula indicates that the aircraft target is three-dimensional, with different parts having different temperature distribution and radiation characteristics depending on their spatial positions, where, $F_{rad}(\ )$ indicates radiation intensity of a target in the case where the target is in the Earth coordinate system, with a position (x, y, z), a measurement angle $\omega$, a scale S, and a time dimension T.

The image-space radiation measurement characteristic function for an aircraft target is described below.

For a point-like or speckle-like target, a radiation measurement characteristic $f_{rad1}$ is related to an azimuth $\bar{\theta}$ of a measuring instrument, and may vary with the azimuth. Spatial average radiance (radiation intensity) characteristic is as follows:

$$f_{rad1} = f_{rad}(\overline{\theta}, \lambda, r) \qquad (2)$$

In the formula, $\overline{\theta} = (\theta_1, \theta_2, \theta_3)$ is a measured azimuth elevation angle, $\lambda$ is an infrared spectral variable, r is a distance.

For a plane-like target, a radiation measurement characteristic $f_{rad2}$ is related to a measurement azimuth and spatial distribution of the target, and varies with the distance as well as with the azimuth $\overline{\theta}$. Radiance characteristic of the target having varying space distribution $\overline{x} = (x_1, x_2, x_3)$ is as follows:

$$f_{rad2} = f_{rad}(\overline{\theta}, \overline{x}, \lambda, r) \qquad (3)$$

(2) Performing target detection on an actually measured infrared image, and identifying position information for each region of a target; tracking the target, to obtain the target's pixel differences between two frames, as well as a moving direction of the target, and then, according to the target's pixel differences between two frames, controlling a two-axis four-framework servo to perform motion compensation for the target.

Activating multi-threaded operations to an input image, to execute the steps as follows:

a $1^{st}$ thread: performing hyperpixel segmentation to obtain sky background, ground background, target regions, etc., and based on the segmentation result and measurement of area and grayscale features of a target, identifying background regions and taking as a negative sample.

a $2^{nd}$ thread: extracting full-image HOG (Histogram of Oriented Gradient) features, and distinguish background from the target regions according to a slide-window method, thus obtaining a suspected target and taking as a positive sample.

a $3^{rd}$ thread: using a full convolutional neural network to detect an input image to obtain a target, and taking it as a positive sample.

Figure 2:
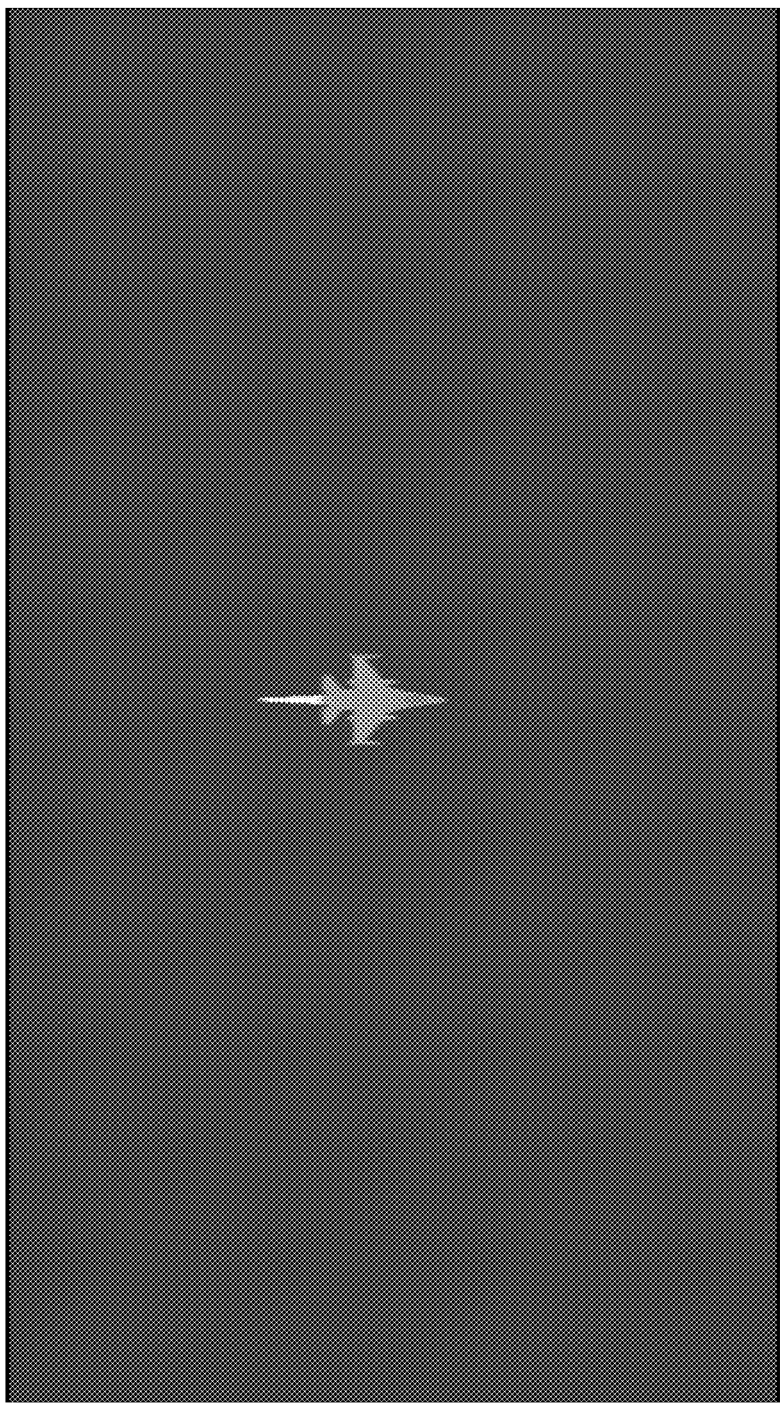
FIG. 2 is an infrared simulation image of an F16 fighter aircraft.
Figure 3:
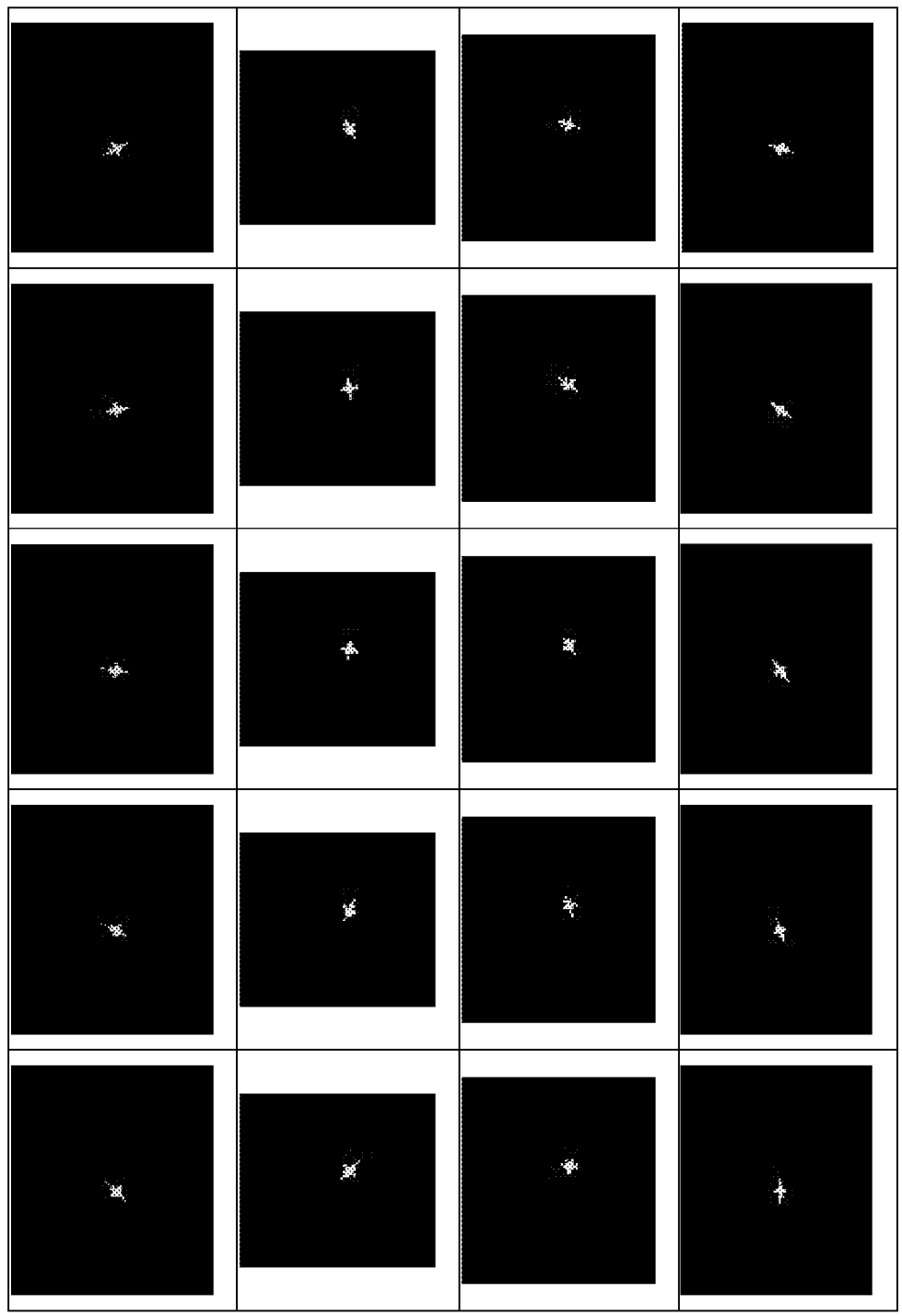
FIG. 3 shows images in a simulation image library for an F16 fighter aircraft, with 8-14 μm waveband, and 1.25 m resolution.
Figure 9:
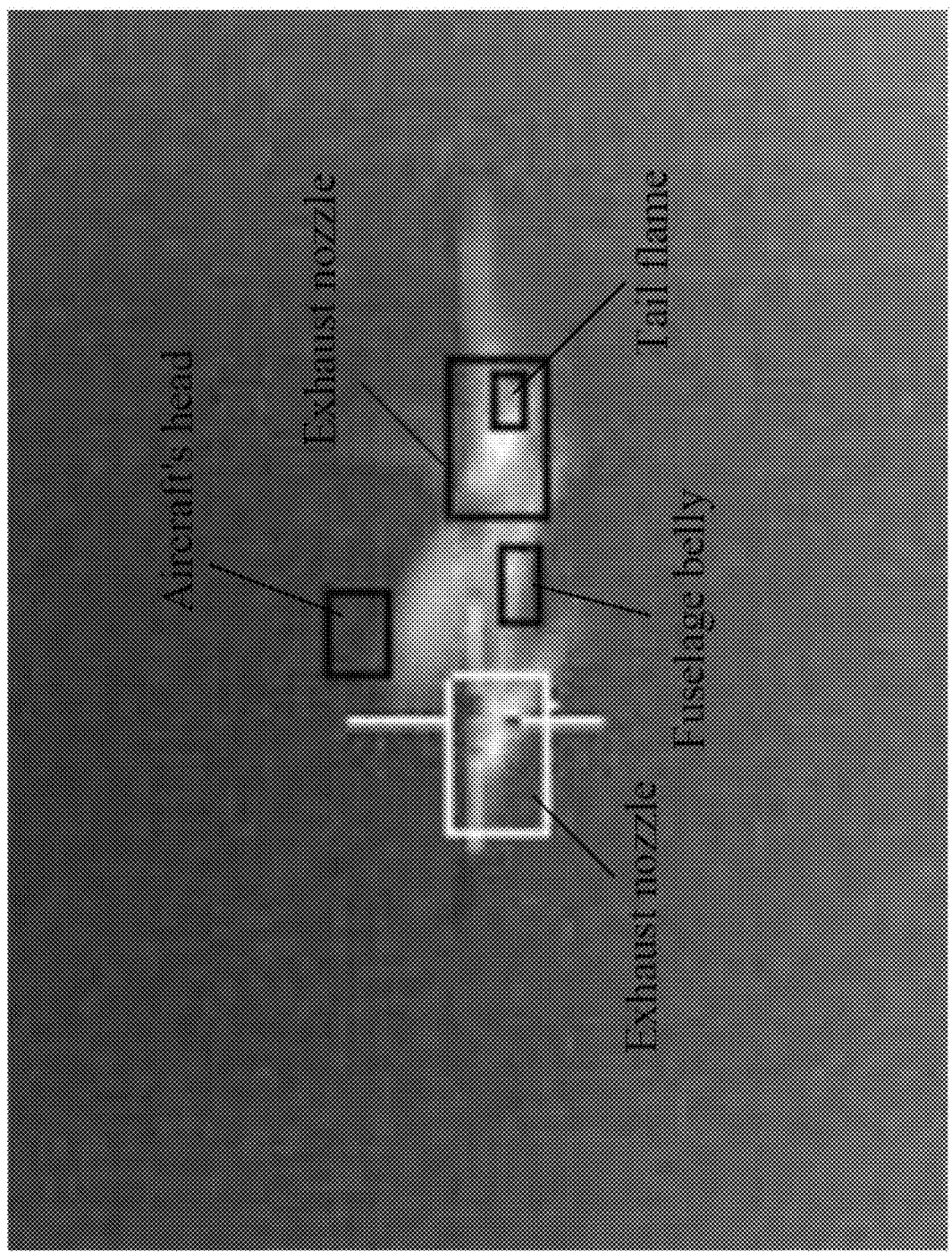
FIG. 9 is a diagram showing results of region-of-interest detection of an actual infrared image.

Results obtained by the above threads are input into a pre-trained SVM classifier, to obtain position information (x, y) of the image of the target; wherein, some training samples of the SVM classifier are shown in FIGS. 2 and 3. The actual detection effect is shown in FIG. 9. SVM is an abbreviation for Support Vector Machine.

The following operations are performed on the target image: inputting the target image, and creating a Gaussian pyramid by using the image, to obtain multi-scale information of the image and thereafter input it into the trained CNN to obtain pixel differences (Vx, Vy) of respective ROIs of the target with respect to the center position of the target;

After the position of the target is detected, a target tracking module is activated, to obtain the target's frame differences between two-frame images as well as the moving target's direction information.

Figure 7:
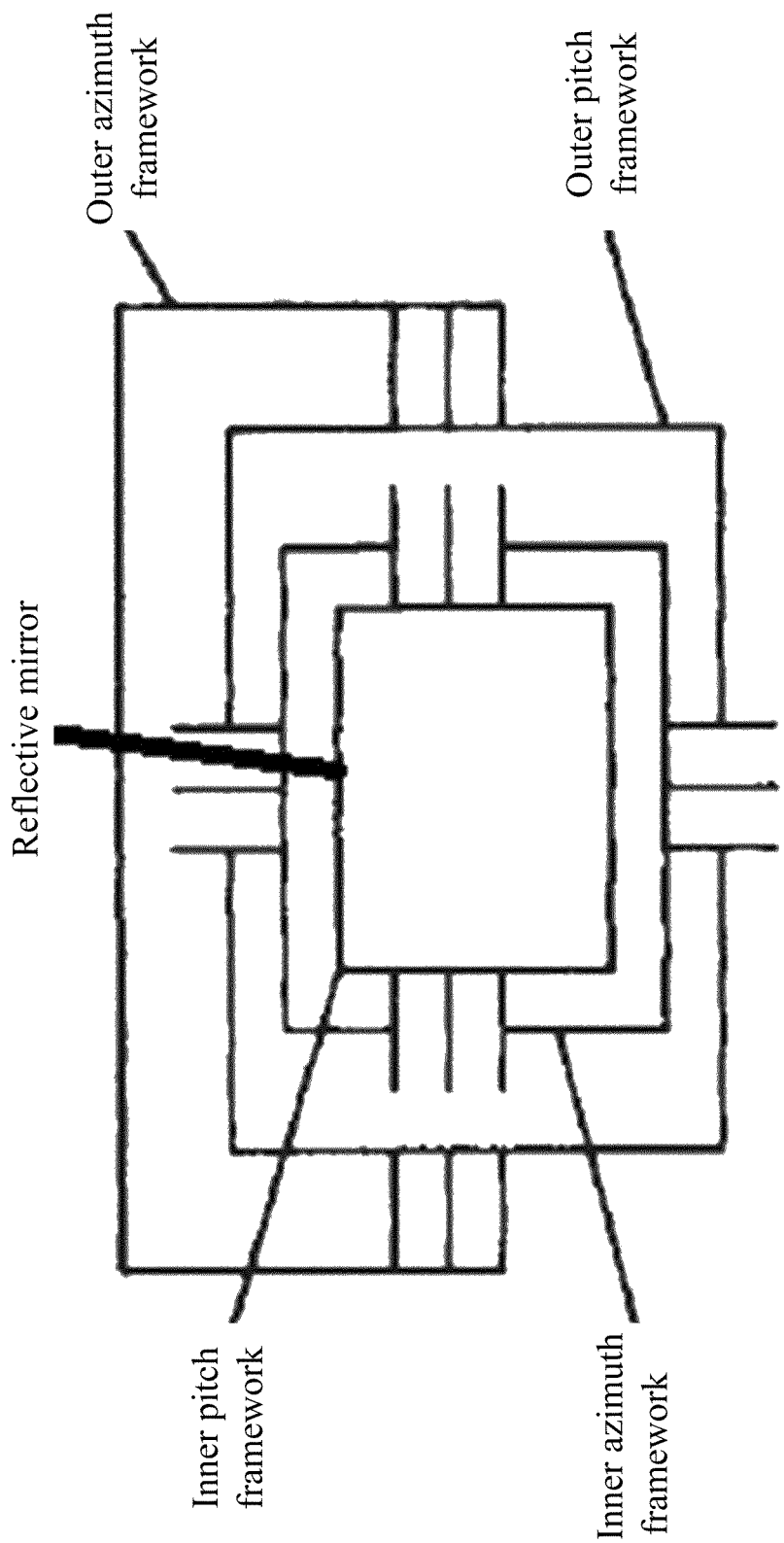
FIG. 7 is a structural diagram of a multi-framework servo.

A servo of this device adopts a four-framework structured servo system, and a schematic structural diagram of a rotary mirror thereof is as shown in FIG. 7; in the figure, an outer framework is responsible for large-range target capturing and tracking; specifically, the outer framework performs motion compensation for the moving target and inputs pixel differences of motion of the target between two-frame images into a servo control system, and the control system responds quickly to an error of input and performs motion compensation on the moving target, so that the target is always located at the center of a field of view.

(3) Activating a servo inner-framework tracking system to scan the target.

Figure 10:
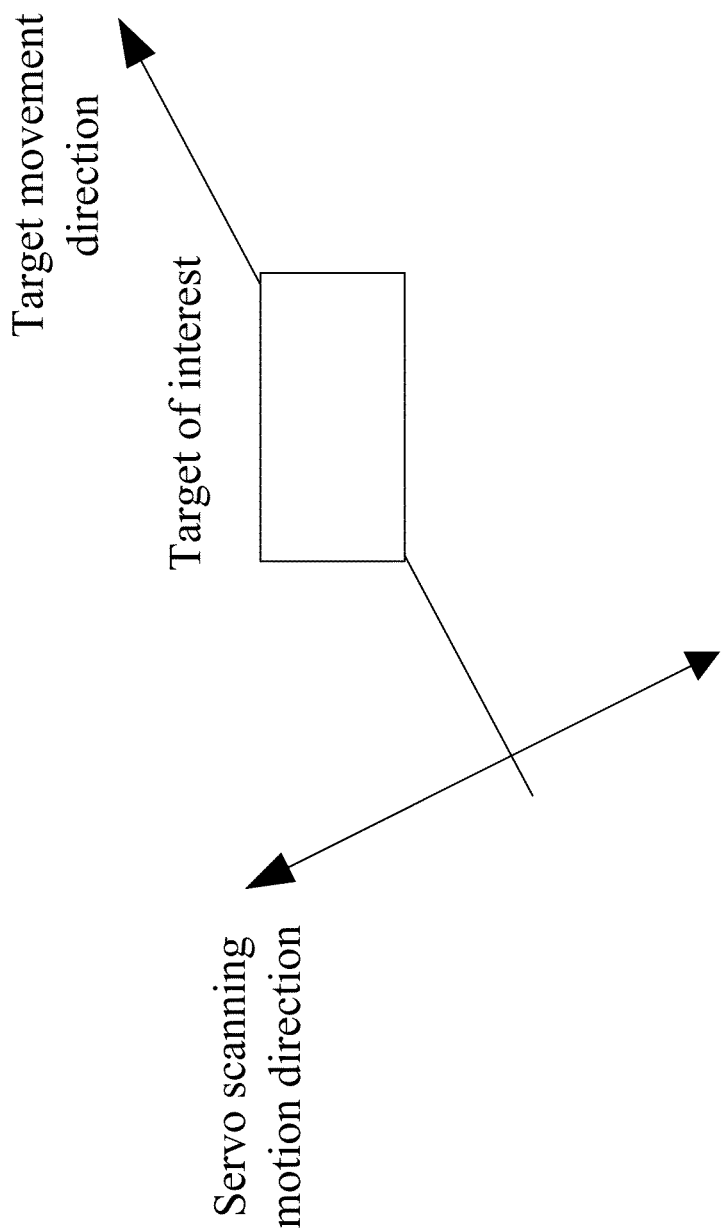
FIG. 10 is a schematic diagram showing that a servo inner-framework tracking system scans a target.
Figure 11:
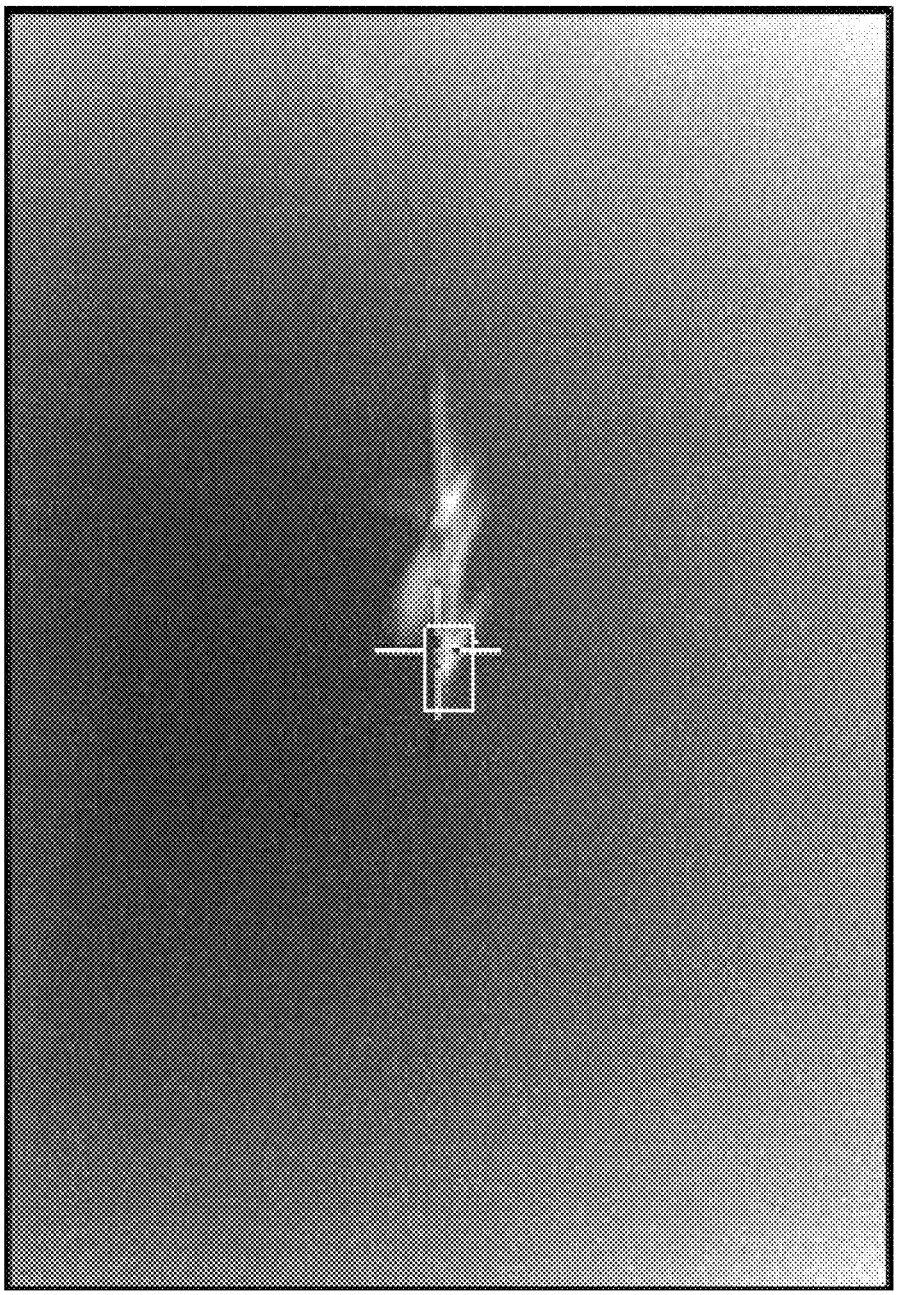
FIG. 11 is a diagram showing results of actual infrared-image tracking for spectrum measurement.

After successfully capturing an image of the target being tracked, controlling the inner-framework to point to each target of interest, and according to moving-direction information of the target, performing N-pixel-size offset motion in a direction shifted by 90° with respect to the moving direction, that is, the scanning direction is the same as the moving direction, and after each scan, it is offset by N pixels perpendicular to the moving direction, and then continues to scan along the moving direction; activating a spectrum measuring module, and recording distance information between the measuring device and the target, and measuring azimuth elevation angle information, scale information and time-dimension information, and inputting the above information into the infrared-spectral-characteristic multi-dimensional multi-scale model obtained in (1) for the target, thus obtaining a final infrared-spectrum model for the target; a schematic diagram for the scanning is as shown in FIG. 10, and an image with an actual effect is as shown in FIG. 11.

Figure 8:
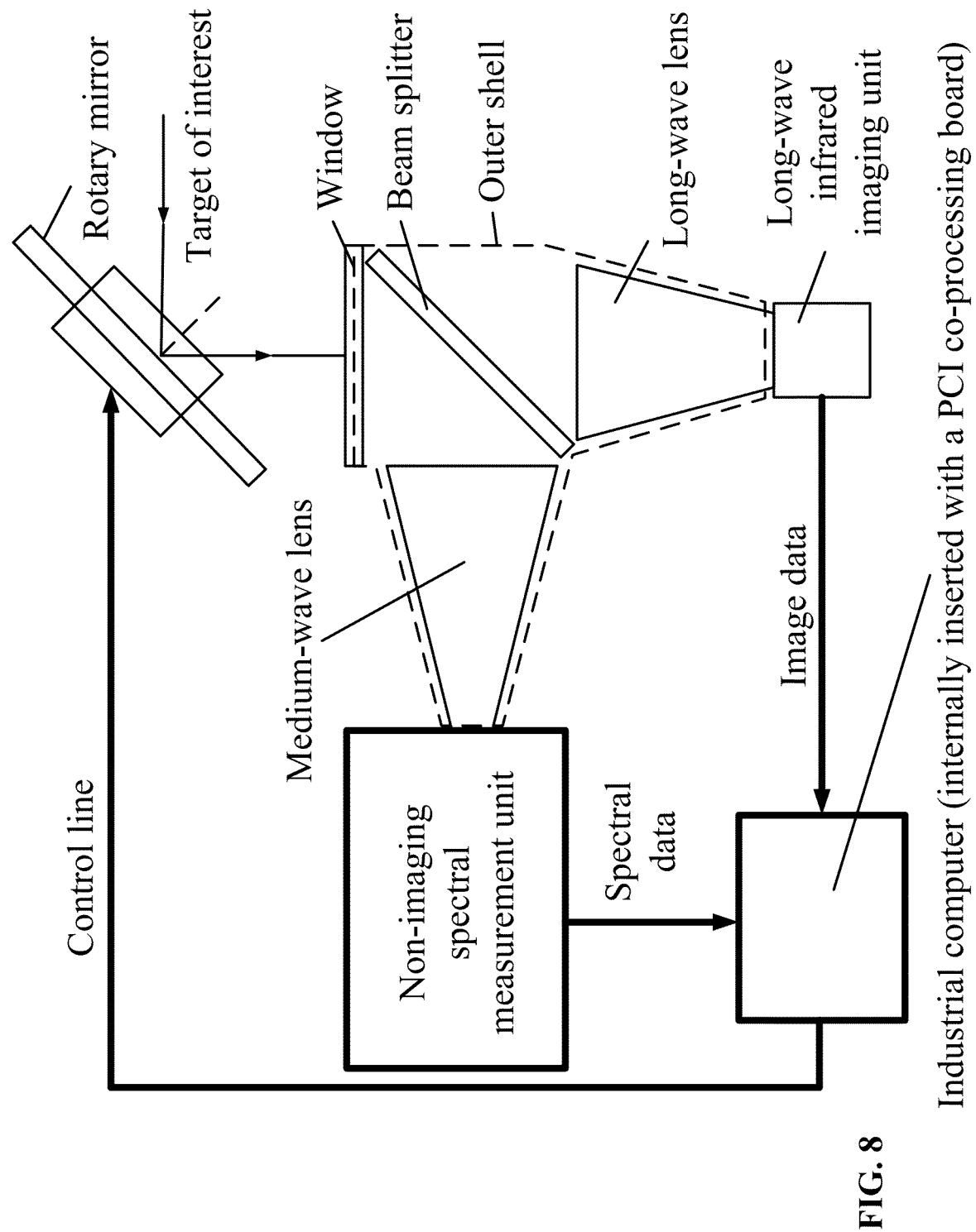
FIG. 8 is a schematic structural diagram of a device of measuring infrared spectral characteristics of a moving target.

The disclosure further provides a measurement device, that is, a target tracking and spectrum measurement device for implementing the above method and capable of combining image information and infrared spectrum information. The schematic diagram of the device is as shown in FIG. 8. Infrared spectrum information of a target is measured according to a multi-dimensional multi-scale infrared spectrum model for the target. The device acquires position information and motion information of ROIs of the target by means of an imaging system, and controls a multi-framework two-axis servo to perform motion compensation for the target, and scans specific regions of the target to obtain infrared spectrum of the target, and establishes an infrared spectrum model for the target. The device is mainly used for identification of a time-sensitive target.

It will be obvious to those skilled in the art that changes and modifications may be made, and therefore, the aim in the appended claims is to cover all such changes and modifications.

What is claimed is:
1. A method, comprising:
performing following steps through a computer:
(1) establishing a multi-dimensional and multi-scale model with infrared spectral features of an object-space target, and extracting an object-space region of interest (ROI) measurement model;
(2) performing target detection on an actually measured infrared image captured by an imaging infrared spectrometer, and identifying position information for each ROI of a target; tracking the target, to obtain the target's pixel differences between two frames, and a moving direction of the target, and according to the target's pixel differences between the two frames, performing motion compensation for the target, wherein (2) comprises:
(2.1) performing multi-threaded operations to an input actually measured infrared image, comprising:
a $1^{st}$ thread: performing hyperpixel segmentation to obtain sky background, ground background, target regions, etc., and based on the segmentation result and measurement of area and grayscale features of a target, identifying background regions and taking as a negative sample;
a $2^{nd}$ thread: extracting full-image Histogram of Oriented Gradient (HOG) features, and distinguish background from the target regions according to a slide-window method, thus obtaining a suspected target and taking as a positive sample;

a $3^{rd}$ thread: using a full convolutional neural network to detect an input image to obtain a target, and taking it as a positive sample;

(2.2) inputting the results obtained by the above threads into a pre-trained support-vector-machine (SVM) classifier, to obtain position information (x, y) of the image of the target;

(2.3) creating a Gaussian pyramid by using the image of the target, to obtain multi-scale information of the image and thereafter input it into the trained convolutional neural network (CNN) to obtain pixel differences (Vx, Vy) of respective ROIs of the target with respect to the center position of the target; and (2.4) detecting and obtaining position information of two-frame images of the target according to (2.2) and processing, to obtain the target's frame differences as well as the moving target's direction information from the two-frame images; based on the target's pixel differences between the two frames obtained in (2.3), performing motion compensation for the target;

(3) scanning the target identified in (2), and after successfully capturing an image of the target being tracked, controlling an inner framework to point to each target of interest, and according to moving-direction information of the target, performing N-pixel-size motion in a direction shifted by 90° with respect to the moving direction, activating a spectrum measuring module, recording distance information between the measuring device and the target, measuring azimuth information, scale information and time-dimension information, and inputting the information into the multi-dimensional and multi-scale model obtained in (1).

2. The method of claim 1, wherein (1) further comprises:

(1.1) establishing a three-dimensional model for a target to be measured;

(1.2) from the three-dimensional model, determining a ROI section of the target to be measured, and performing material classification to the three-dimensional model of the above-mentioned section to determine a radiation source;

(1.3) measuring infrared spectral characteristics of the radiation source, to obtain object-space infrared-spectral-characteristic distribution at a specific angle.

3. The method of claim 2, wherein an object-space infrared spectrum radiation measurement characteristic of a target is expressed as follows:

$$F_{rad}(x,y,z,\omega,S,T) \quad (1)$$

where, $F_{rad}(\ )$ indicates a radiation intensity of a target in an Earth coordinate system, with a position (x, y, z), a measurement angle $\omega$, a scale S, and a time dimension T;

an image-space radiation measurement characteristic function for a target is expressed as follows:

for a point-like or speckle-like target, a radiation measurement characteristic $f_{rad1}$ is expressed as below:

$$f_{rad1}=f_{rad}(\overline{\theta},\lambda,r) \quad (2)$$

where, $\overline{\theta}$ is an azimuth of a measuring instrument, $\lambda$ is an infrared spectral variable, r is a distance between the measuring instrument and the target;

for a plane-like target, a radiation measurement characteristic $f_{rad2}$ is expressed as below:

$$f_{rad2}=f_{rad}(\overline{\theta},\overline{x},\lambda,r) \quad (3)$$

where, $\overline{x}$ is spatial distribution of the target, $\overline{\theta}$ is an azimuth of a measuring instrument, $\lambda$ is an infrared spectral variable, and r is a distance between the measuring instrument and the target.

4. A measurement device for implementing the method of claim 1, the device comprising: an industrial computer, a rotary mirror, a beam splitter, a medium-wave lens, a long-wave lens, a non-imaging infrared spectrum measuring unit, and a long-wave infrared imaging unit;

wherein:

a control interface of the industrial computer is connected to the rotary mirror;

the medium-wave lens is mounted on the non-imaging infrared spectrum measuring unit;

an output end of the non-imaging infrared spectrum measuring unit is connected to an input end of the industrial computer;

the long-wave lens is mounted on the long-wave infrared imaging unit; and an output end of the long-wave infrared imaging unit is connected to the input end of the industrial computer.

5. The device of claim 4, wherein the rotary mirror adopts a four-framework servo control and comprises: a reflective mirror, an inner pitch framework, an inner azimuth framework, an outer pitch framework, and an outer azimuth framework, which are sequentially arranged from inside to outside.

* * * * *